Figure 5:
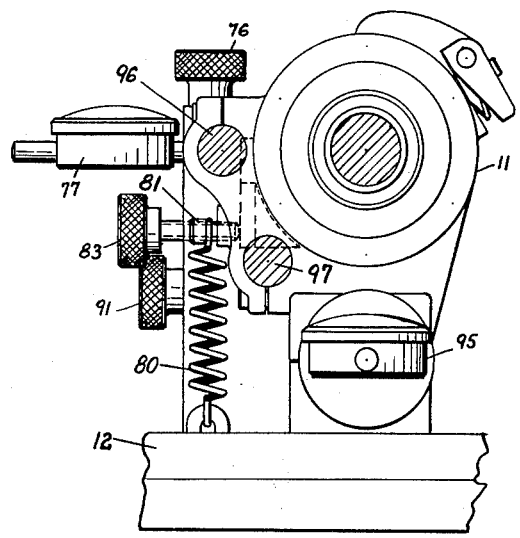

March 19, 1963     H. P. BOGGIS     3,081,585
RELIEVING FIXTURE FOR GRINDING MACHINES
Filed May 16, 1961     4 Sheets-Sheet 1
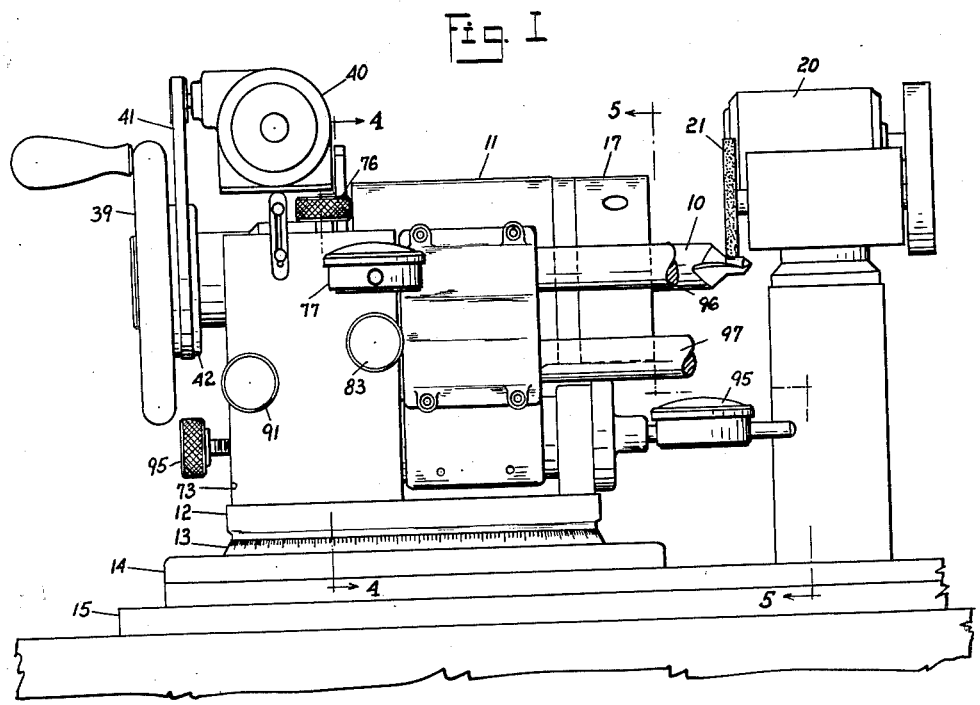
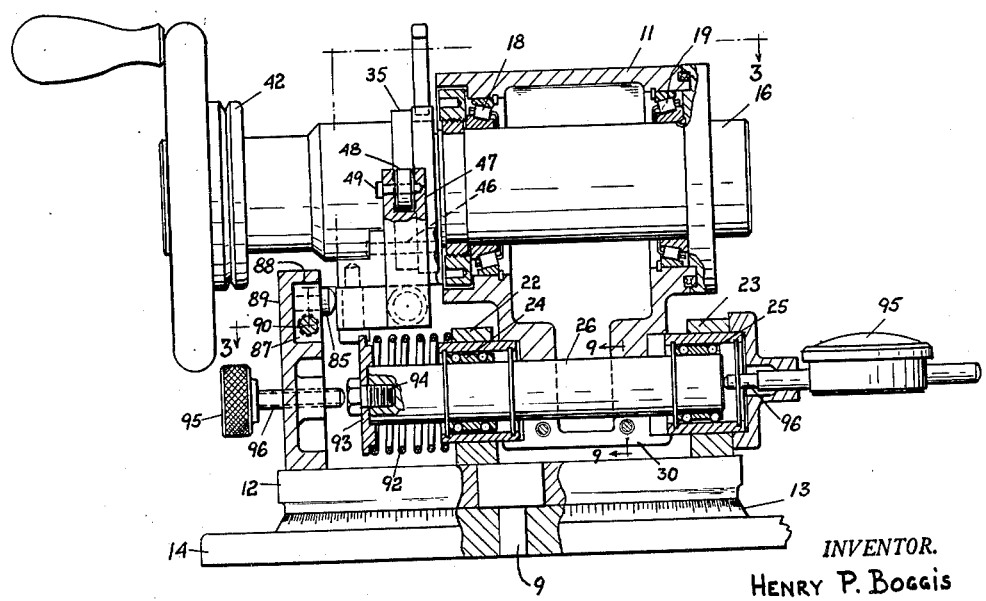
INVENTOR.
HENRY P. BOGGIS
BY
Teare, Fetzer + Teare
ATTORNEYS

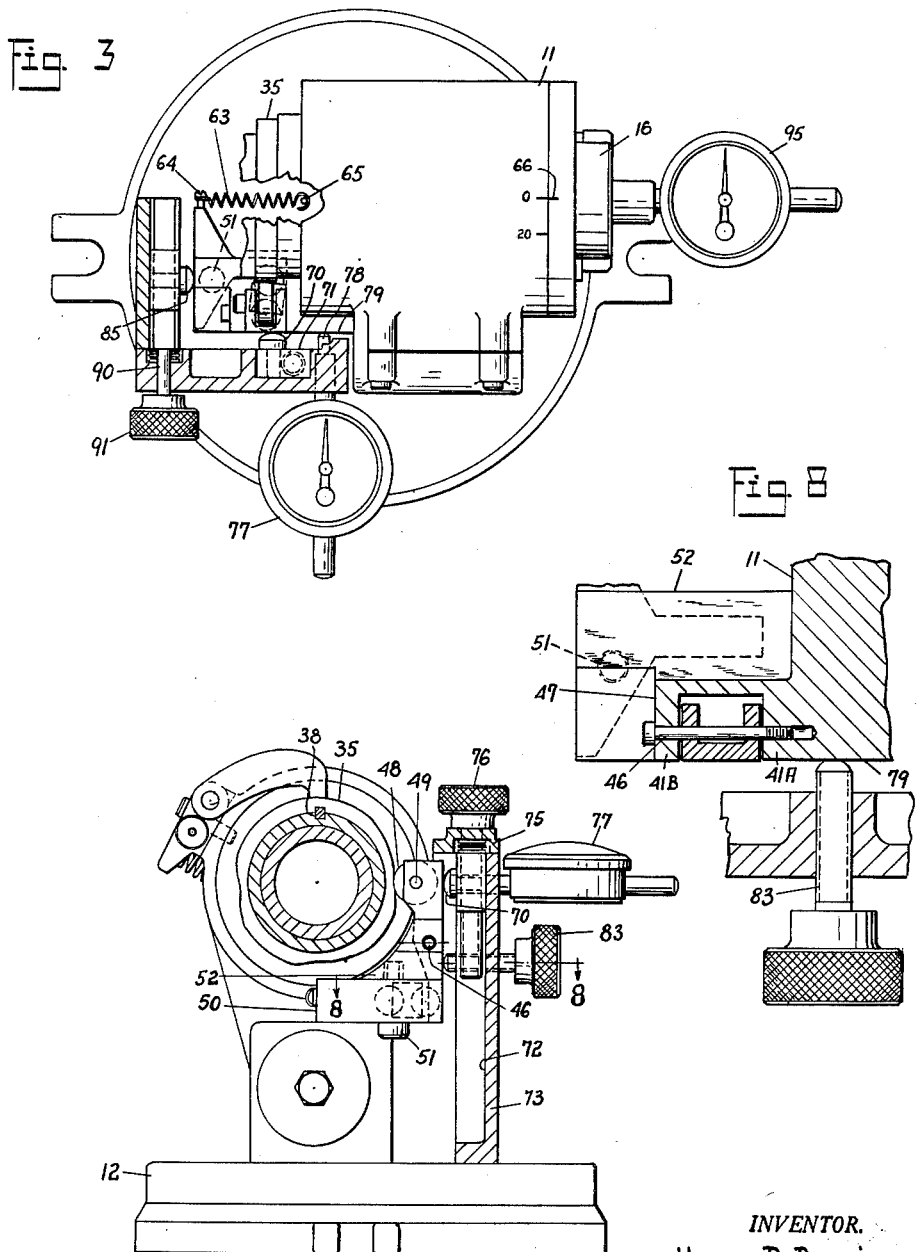

March 19, 1963  H. P. BOGGIS  3,081,585
RELIEVING FIXTURE FOR GRINDING MACHINES
Filed May 16, 1961  4 Sheets-Sheet 3

INVENTOR.
HENRY P. BOGGIS

BY Teare, Felzer & Teare
ATTORNEYS

March 19, 1963  H. P. BOGGIS  3,081,585
RELIEVING FIXTURE FOR GRINDING MACHINES
Filed May 16, 1961  4 Sheets-Sheet 4
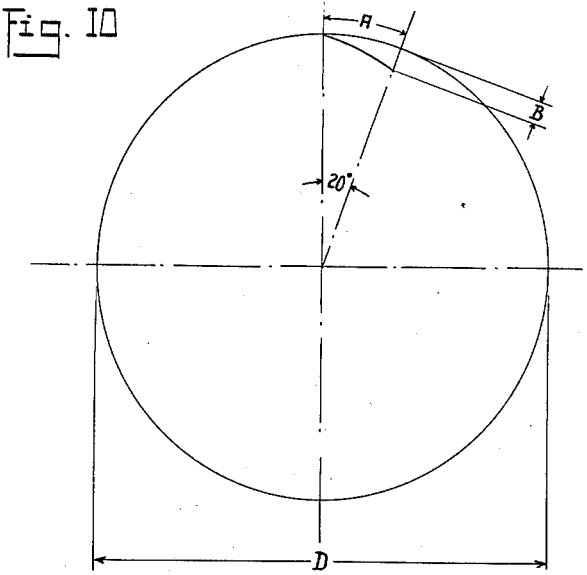
Fig. 10
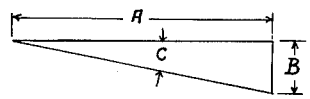
Fig. 11
| CAM DROP REQUIRED TO PRODUCE VARIOUS CLEARANCE ANGLES IN RELATION TO TOOL DIAMETERS FOR 20° ROTATION | | | | |
|---|---|---|---|---|
| TOOL DIA. | CLEARANCE ANGLES | | | |
| | 2 1/2° | 5° | 7 1/2° | 10° |
| 1/4 | .002 | .004 | .006 | .008 |
| 3/8 | .003 | .006 | .009 | .012 |
| 1/2 | .004 | .008 | .012 | .016 |
| 5/8 | .005 | .010 | .015 | .020 |
| 3/4 | .006 | .012 | .018 | .024 |
| 7/8 | .007 | .014 | .021 | .028 |
| 1 | .008 | .016 | .024 | .032 |
Fig. 12
INVENTOR.
HENRY P. BOGGIS
BY
Teare, Fetzer & Teare
ATTORNEYS

United States Patent Office 3,081,585
Patented Mar. 19, 1963

3,081,585
RELIEVING FIXTURE FOR
GRINDING MACHINES
Henry P. Boggis, Cleveland, Ohio, assignor to Henry P.
Boggis Company, Cleveland, Ohio, a corporation of
Ohio
Filed May 16, 1961, Ser. No. 110,430
15 Claims. (Cl. 51—234)

This invention relates to a machine fixture which is particularly adapted as a work supporting structure for use with a machine such as a grinding machine.

The invention is particularly suited as a relieving fixture adapted for supporting tools such as drills, counterbores, cutters, hollow mills and the like and for actuating them during the grinding treatment, so as to provide radial, or axial, or the combination of radial and axial relief during the grinding operation.

A disadvantage of existing grinding fixtures is that both axial and radial relief cannot be predetermined in the fixture. Thus, considerable skill and experience is necessary for an operator to set the fixture for the precise amount of relief. This varies with the diameter of the tool, the number of flutes and is generally measured in clearance angles from 0° to 20°. Consequently, considerable time has been consumed in accurately measuring and changing the parts which contribute to the relieving motion.

An object of the present invention is to obtain a relieving fixture which will provide means for grinding and sharpening a large variety of cylindrical evently fluted tools having one or more cutting edges parallel to or at various angles to the axis of the tool. The invention contemplates a structure wherein infinitely variable radial and axial relief are available and can be accurately measured and obtained by means of simple adjustments on the fixture, whereby an inexperienced operator can readily set the fixture and obtain consistent satisfactory results in the desired relieving motions of the fixture.

An additional object is to construct a fixture, wherein either radial or axial relief may be selected, either singly or jointly, by means of simple lock-out devices which are readily accessible on the fixture. Additionally, such lock-out devices, when actuated, permit use of the fixture for plain cylindrical grinding. The invention also seeks to eliminate the need for change gears as part of the operating mechanism and includes an arrangement by means of which the desired radial and/or axial relief can be accurately measured and set by means of dial indicators.

Briefly, the present invention utilizes a head in which the tool to be ground is rotatably supported and includes a cam which is mounted on the work supporting spindle for rotation therewith. Provision is then made for contacting the cam by means of a follower, which is so mounted on the head with relation to a stationary reactionary member that movement of the follower, with respect to the cam, results in a rocking action of the head to effect a radial relief on the tool being ground. The cam follower is also connected to a device which effects a reciprocation of the head so as to produce the axial relief on the tool to be ground. Provision is made for varying the throw of the rocking and reciprocating motions, and each is adjustable independently of the other whereby the degree of relief can be readily pre-set. Additionally, dial indicators are provided for enabling the extent of each setting to be accurately indicated in connection with a predetermined chart. Arrangement is also made for locking out either radial or axial relief producing movements of the head so that the fixture may be used as for straight cylindrical grinding as desired.

A further object of the invention is to provide a fixture of the aforesaid type which is simple and compact in construction, which is smooth in operation and which may be readily adjusted and operated.

Figure 6:
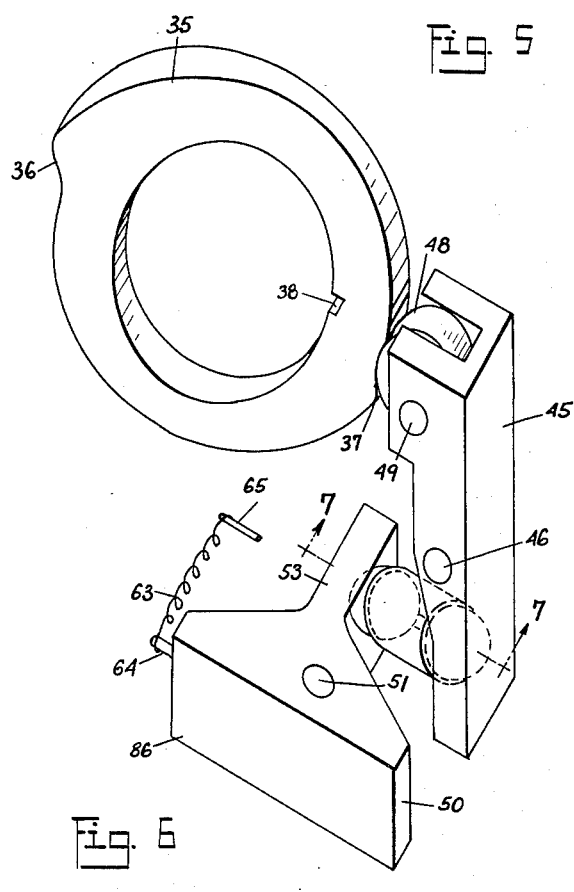
Figure 7:
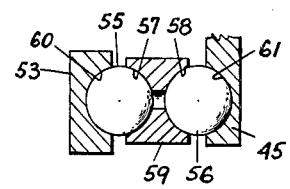
Figure 9:
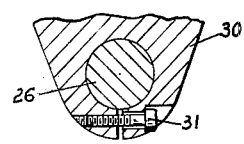

In the drawings,
FIG. 1 is a front elevation of a fixture embodying the present invention;
FIG. 2 is a front elevation of the fixture showing a portion thereof in vertical section;
FIG. 3 is a top-plan view of the fixture with a portion thereof shown in sectional view;
FIG. 4 is an end view of the fixture showing a portion thereof in cross-section taken on the line 4—4 in FIG. 1;
FIG. 5 is a sectional view taken on a plane indicated by the line 5—5 in FIG. 1;
FIG. 6 is a perspective view showing the cam and its associated mechanism for effecting the rocking and reciprocating motions respectively of the head;
FIG. 7 is a horizontal section taken on a plane indicated by the line 7—7 in FIG. 6;
FIG. 8 is a horizontal section taken on a plane indicated by the line 8—8 in FIG. 4;
FIG. 9 is a vertical section taken on a plane indicated by the line 9—9 in FIG. 2;
FIG. 10 is a diagram on an enlarged scale illustrating the angle of relief;
FIG. 11 is a diagram illustrating a triangle used for computing the linear measurement on the dial indicator corresponding to any preselected angle of relief, and
FIG. 12 is a portion of a chart which correlates angle of relief to linear measurements on the dial indicators.

The fixture is illustrated in the drawings as supporting a tool 10 for treatment by the grinding wheel of a grinding machine. The fixture comprises a head having a main body portion 11 which is mounted upon a base 12. The base may be swivelly supported at 9 for rotation upon a carriage 14 which is adapted to be slidably mounted in the platen 15 of a pedestal and which is graduated as indicated at 13. A spindle 16 is rotatably mounted in the head bearings 18 and 19 and is provided, as shown in FIG. 1, with a chuck 17 for receiving the tool to be ground. The grinding machine is indicated in general at 20 as having a grinding wheel 21, mounted for engaging the tool and supported for movement with reference thereto in any suitable manner.

The head is mounted on the base for both rocking and reciprocating movement with respect to the base 12. In the form illustrated, this is accomplished by utilizing bearing blocks 22 and 23 which are positioned in alignment beneath the spindle and are secured to the base 12 by any suitable means. The blocks carry ball bearing units indicated at 24 and 25, respectively, within which a pin 26 is mounted for oscillation and reciprocation. The head has a trunnion 30 which may be clamped to the pin 26 as by cap screws 31, whereby the head is pivotally supported for rocking motion with respect to the base. When such motion is combined with rotation of the tool, a radial relief is produced on the cutting edge. Similarly, whenever the head is reciprocated, the pin 26 is correspondingly reciprocated. Reciprocation of the head, when combined with rotation of the tool, imparts axial relief thereto during the grinding operation.

The relieving motions of the head are produced by a cam 35 which, for purpose of illustration, has two peripheral lobes 36 and 37 respectively. The cam is removably fixed to the spindle 16 and, for such purpose, is provided with a keyway 38 which engages a corresponding key carried by the spindle exteriorly of the rearward end of the head. The number of lobes on the cam are equally spaced and correspond to the number of flutes in the tool to be ground.

Rotation of the cam may be effected by a hand wheel 39 which is fixed to the rearward end of the spindle as shown in FIG. 2, or by means of an electric motor 40 which, as shown in FIG. 1, is connected by a belt 41 to a sheave 42 on the hub of the hand wheel.

Rotation of the cam is utilized for producing the aforesaid relieving motions of the head. For accomplishing such purpose the cam actuates a first or radial rocker lever or arm 45 which in turn actuates a second or axial rocker lever or arm 50. The arms are so interconnected that a single cam effects operation of both radial and axial motions. In the form illustrated, the rocker arm 45 is pivotally mounted at 46 on a bracket 47 which may be a pad that is integral with the housing 11 and projects laterally therefrom, as shown in FIG. 8. The upper end of the arm 45 carries a roller 48 which is journaled at 49 for rotation in the arm and for engagement with the peripheral surface of the cam 35. The lower end of the arm 45 is operatively connected to a rocker arm, indicated in general at 50, as being pivotally mounted by a pin 51 upon the pad 52, which may constitute an extension of the pad 47. The arm 50 is shown as a T-shaped member, which is supported on the head of the pivot pin 20 51, while the shank of the pin is fastened as by a threaded connection to the pad. The leg 53 of the T-shaped member is operatively connected to the lower portion of the arm 45.

The preferred operative connection between the arms 45 and 50 embodies a device which allows freedom of movement of each arm about its respective pivot, notwithstanding the fact that the axis of one pivot is at right angles to the axis of the other. A preferred form of such connection includes balls or spheres 55 and 56 each of which has a portion positioned in spherical segmental recesses 57 and 58 respectively in a spacer ring 59. There is a gap between the spacer ring 59 and each of the arms 45 and 50, and each gap is bridged by one of the spheres as is shown in FIG. 7. To complete the connection, the sphere 55 rests partially within a recess 60 in the leg 53 while the sphere 56 rests partially within a spherical segmental recess 61 in the arm 45. A spring 63 one end of which is attached to a post 64 on the arm 50 and the other end of which is attached to a post 65 on the housing 11 operates to bias the legs 53 toward the lower end of the arm 45 through the ball 55, ring 59 and ball 56 and also to bias the arm 45 so as to hold the follower 48 into engagement with the peripheral surface of the cam 35. Thus the cam and arms 45 and 50 are mounted as a unit for movement with the head 11, but the arms 45 and 50 are capable of relative motion with respect to the head. Such relative motion of the arm 45 is utilized for imparting a rocking action to the head while the relative motion of the arm 50 is utilized for imparting a reciprocating motion to the head.

To effect a rocking motion of the head, the arm 45 is arranged to coact with a relatively stationary reactionary member 70 which operates as an abutment for causing the head to rock about the axis of the pin 26 under the influence of the cam 35. In the construction illustrated the abutment 70 is in the form of a pin which is mounted within a carriage 71, the latter of which is guided for vertical movement within a guideway 72 in a bracket 73. The bracket, in turn, may be rigidly fastened to the base 12 in any suitable manner. The carriage 71 may be provided with a threaded aperture through which a threaded stem 74 is adapted to project. The stem extends downwardly from the top of the bracket to a point beneath the axis of the pivot pin 46 and extends at its upper end through an opening in a cap 75 and terminates in a head 76 by means of which the stem may be rotated. Such rotation adjusts the position of the slide and, therefore, the position of the abutment 70 with respect to the axis of the pin 46. When the abutment is in the position shown in FIG. 4 the throw of the head is at a maximum, whereas when the axis of the abutment 70 is in the same horizontal plane as the axis of the pin 46 there is no rocking motion imparted to the head. Thus, the extent of the rocking motion can be varied to suit any desired value. In this way the extent of radial relief to the grinding wheel may be varied as desired.

By mounting a dial indicator 77 on the bracket 73 with the usual actuating pin 78 thereof bearing against a surface 79 of the head, and by utilizing linear measurements on the dial of the indicator in thousandths of an inch, an operator may, by reference to a chart, preset the fixture for any desired angle of rocking motion of the head merely by adjustment of the position of the reactionary abutment 70 with reference to the axis of the pivot pin 46. The head is normally biased toward the abutment by a spring 80 which has one end thereof attached to the base 12 and the other end thereof attached to a post 18 on the head. This operates to hold the arm 45 against the follower 48.

In FIGS. 10 to 12 inclusive, I have shown means whereby the angle of radial relief can be calculated so that a chart can be prepared by means of which linear measurements on the dial 77 can be ascertained for different diameters of tool to be ground, and for different radial clearance angles thereon. Thus in FIG. 10, D represents the diameter of the tool to be ground; A represents the peripheral distance on the circumference of the tool subtended by an angle of 20°; while B represents the linear measurement corresponding to the required rocking of the head to produce the desired angle of relief. In FIG. 11 there is shown a triangle having the dimensions A and B for an angle C, wherein C is the clearance angle desired for the tool to be ground.

Referring to FIG. 10, the dimension A is represented by the following formula:

$$A = 3.1416 \times D \times \frac{20°}{360°}$$

The dimension B is represented by the following formula:

$$B = A \times \text{tangent } C$$

Substituting the value of A in the formula for B then $$B = 3.1416 \times D \times \frac{20°}{360°} \times \text{tangent } C$$

Using the foregoing formula for various clearance angles desired, a chart 82 can be prepared which will show the dimension B corresponding to any selected clearance angle for any predetermined diameter of tool. Such dimension constitutes the linear dimension on the dial of indicator 77, and corresponds to the cam drop required to produce the desired clearance angle in such tool.

To facilitate a determination of the dial setting for any desired relief angle on any predetermined tool, the head 11, as shown in FIG. 3, has a line designated zero and another line designated 20°, while the spindle has a line designated 66 which is shown opposite the zero mark on the head. At such time the lower most point of cam should engage the follower 48, as is shown in FIG. 6. Additionally, if at such time the axis of the reactionary member 70 is in alignment with the horizontal plane passing through the axis of the pivot 46, the reading on the indicator 77 should indicate zero. Assuming then, that a clearance angle of 5° is desired on a tool having a 1 inch diameter, the spindle 16 is manually rotated with reference to the head 11 until the line 66 is opposite the 20° mark on the head. Then while holding the spindle in such position, the knob 76 is turned thereby raising the button 70, and causing the head to rock about the axis of the pin 26 until the pointer on the indicator 77 is opposite the .016 designation on the dial of the indicator. Such designation represents thousandths of an inch. By maintaining such position of the member 70, the fixture will be automatically operated to effect a clearance angle of 5° on the tool.

To lock out the rocking action of the head without removing the cam 35 from the spindle, I provide a thumb screw 83 which extends through a wall of the bracket 73 and is adapted to engage the surface 79 of the head. The threaded shank of the screw 83 is sufficiently long as to force the head against the tension of the spring 80, so as to hold the arm 45 out of contact with the abutment 70 at all positions of the follower with respect to the cam. At such time the follower will be held in engagement with the cam by virtue of the pressure exerted by the spring 63.

To obtain reciprocation of the head during rotation of the spindle, I utilize the oscillating motion of the arm 50 about the axis of the pivot 51, together with a coacting abutment 85 which is adapted to engage the vertical surface 86 of the arm 50. Provision is made for so supporting the abutment 85 that it can be shifted from a position in alignment with the axis of the pivot 51 outwardly to the end of the arm adjacent the post 64. Such movement is utilized for varying the throw of the reciprocation and thereby for controlling the amount of the axial relief imparted to the tool during the grinding operation.

In the preferred arrangement, the abutment 85 is fixed to a carriage 87 which is slidably mounted within a guideway 88 in a bracket 89. The bracket, in turn, is rigidly fastened to the base 12 in any suitable manner and is positioned at substantially a right angle to the bracket 73. The carriage 87 may be adjustably positioned within the guideway by means of a threaded member 90, which engages the correspondingly threaded aperture in the carriage, and which projects through an opening in the bracket 73 and terminates in the head 91. Thus, upon rotation of the head 91, the abutment 80 may be positioned along the surface 86 from a point in alignment with the axis of the pivot 51 outwardly to the end of the surface 86, adjacent the post 64. Whenever the axis of the abutment 85 is in alignment with the axis of the pivot 51, as shown in FIG. 3, there will be substantially no reciprocation. Maximum reciprocation results whenever the abutment is positioned near the post 64. The arm 50 is biased into engagement with the abutment 85 by means of a spring 92, one end of which bears against the bearing block 22, the other end of which bears against a plate 93 which is fastened to the pin 26 by the member 94.

To permit the extent of reciprocation to be pre-set, I have shown a dial indicator 95, the stem 96 of which bears against the end of the pin 26 and records the setting on the dial in accordance with the position of the abutment 85 with reference to the pivot of the arm 50. The dial of the indicator 95 shows directly, in thousandths of an inch, the linear movement of the pin 26 and therefore the linear movement of the head with respect to the base 12. By reference to a chart which is prepared in advance by calculation, in a manner similar to that for the axial relief angle as explained in connection with the chart of FIG. 12, any selected axial clearance angle can be pre-set for any given tool diameter, by merely turning the knob 91 until the reactionary member 85 is positioned at such point of indicated measurement on the chart. It is to be understood that the zero reading on the indicator 95 would occur when the reactionary member 85 is in the same plane as the axis of the pivot pin 51, and when the match point 66 is opposite the zero mark on the head 11. Then, when the spindle 16 is turned to bring the match point 66 opposite the 20° mark on the head 11, the knob 91 is turned manually to move the reaction member outwardly until the pointer on the dial 95 is opposite the mark on the dial, designating thousandths of an inch, which corresponds to that selected from the chart prepared for designating axial relief.

To lock out the reciprocating action of the head without removing the cam 35 from the spindle, I provide a thumb screw 95, the shank 96 of which extends through a threaded opening in the wall of a bracket 89, as shown in FIG. 2. The shank is in substantial alignment with the head of the fastening member 94 and is sufficiently long to engage the head and to force the pin 26 together with the head 11 to the right, as shown in FIG. 2, sufficiently to hold the arm 50 out of contact with the abutment 85 in all positions of the follower with respect to the cam. Such condition is suitable for enabling the fixture to be used for plain cylindrical grinding, when the lockout feature for the radial grinding is also set, as previously set forth.

To stabilize the tool being ground where such tool is relatively long, I have shown a pair of stabilizing bars 96 and 97 which may support a stabilizing carriage (not shown). Such carriage may comprise the usual structure suitable for such purpose.

An advantage of the present invention is the fact that both radial and longitudinal relief can be pre-set by a relatively unskilled operator and that the amount of each relief can be adjusted independently of the other. Moreover, each relief may be discontinued, independently of the other, in accordance with the requirements of the tool to be ground. Additionally, the fixture provides a compact structure by means of which both radial and axial relief operations can be obtained with the use of a single cam.

I claim:

1. A fixture for relief grinding of cutting tools comprising a head, a work spindle mounted for rotation in the head, a base, said head being mounted on said base for movement axially of the spindle and for pivotal movement with respect to the base, a cam mounted for rotation with the spindle, a first lever pivoted on the head and coacting with the cam and base for rocking such head with respect to the base, and a second lever operated by the first named lever and coacting with the base for moving the head axially of said spindle with respect to the base.

2. A fixture according to claim 1, wherein the first mentioned lever includes a follower carried thereby and engaging the cam.

3. A fixture according to claim 2, wherein a relatively stationary reactionary member adjustably mounted on the base coacts with the first named lever for varying the pivotal movement of the head with respect to the base.

4. A fixture according to claim 1, wherein each of the levers is pivoted to the head, the levers being interconnected for transmitting motion of one to motion of the other.

5. A fixture for relief grinding of cutting tools comprising a head, a work spindle mounted for rotation in the head, a base, said head being mounted on the base for rocking movement with respect thereto about a horizontally extending pin, a cam mounted for rotation with the spindle, a lever having a follower pivoted to the head and coacting with the cam, whereby the lever is rocked upon rotation of the cam, a relatively stationary reactionary member engaging the lever, and adjusting means for moving the reactionary member with relation to the lever to vary the pivotal movement of the lever thereby controlling the rocking throw of the head.

6. A fixture according to claim 5, wherein a spring is connected to the head and to the base and operates to urge the cam, the follower and the lever as a unit toward the reactionary member and to hold the lever yieldingly against the member.

7. A fixture according to claim 5, wherein a selectively operable member carried by the base operates to hold the lever out of contact with the reactionary member to lock out the rocking movement of the head.

8. A fixture according to claim 5, wherein an indicating member is supported on the base and has a portion thereof engaging the head and operating to indicate the extent of inclination of the head with respect to a reference point on the indicating member.

9. A fixture according to claim 5, wherein the adjusting means includes a carriage on which the reactionary member is mounted, and an adjusting screw for varying the position of the reactionary member with respect to the lever.

10. A fixture according to claim 4, wherein the connection between the two levers includes two spheres having a spacing member therebetween, and wherein each sphere has a portion thereof engaging one of the levers.

11. A fixture according to claim 10, wherein a spring has one end connected to the head and the other end connected to one of the levers, and operates to hold the spheres and spacing member therebetween in operative position between the two levers.

12. A fixture according to claim 4, wherein each actuating means includes a reactionary member and wherein provision is made for adjusting each reactionary member independently of the other for coaction with a lever.

13. A fixture for relief grinding of cutting tools comprising, a head, a work spindle mounted for rotation in the head, a base, a longitudinally extending pin mounted parallel to the work spindle in operative position for reciprocation on the base and fastened to said head, a cam mounted for rotation with the spindle, a first lever pivotally mounted on the head, connecting means between the first lever and the cam for moving the first lever upon rotation of the cam, a second lever pivotally mounted on the head operated by the first lever, a reactionary member coacting with the second lever to effect reciprocation of the longitudinally extending pin and head upon rotation of the cam, and a spring coacting with the base and head to urge the second lever into engagement with the reactionary member.

14. A fixture according to claim 13, wherein a selectively operable member carried by the base operates to hold the second lever out of contact with the reactionary member to lock out the reciprocating movement of the head.

15. A fixture according to claim 13 wherein an indicating member is supported on the base and has a portion thereof engaging the head and operating to indicate the extent of longitudinal movement of the head with respect to a reference point on the indicating member.

References Cited in the file of this patent

UNITED STATES PATENTS

| | | |
|---|---|---|
| 2,752,740 | Mouw | July 3, 1956 |
| 2,764,855 | Dawson | Oct. 2, 1956 |